United States Patent [19]

Schweizer

[11] Patent Number: 5,438,451
[45] Date of Patent: Aug. 1, 1995

[54] LINEARLY FINE-ADJUSTABLE STAGE

[76] Inventor: Bruno Schweizer, 7082 Oberkochen, Jenaerstr. 31, Germany

[21] Appl. No.: 123,378

[22] Filed: Sep. 17, 1993

[30] Foreign Application Priority Data

Sep. 25, 1992 [DE] Germany .......................... 42 32 079.8
Sep. 25, 1992 [DE] Germany .......................... 42 32 077.1

[51] Int. Cl.⁶ ........................ G02B 21/26; G02B 26/08
[52] U.S. Cl. ...................................... 359/393; 359/224; 359/391; 359/392
[58] Field of Search .................... 359/391–395, 359/223–226, 808, 809, 813, 814, 823, 824, 871, 872, 879, 881, 896; 250/442.11, 440.1, 306; 310/328, 330; 74/479 M, 479 MF, 479 ML, 479 MM, 89.2, 89.22

[56] References Cited

U.S. PATENT DOCUMENTS

| | | |
|---|---|---|
| 2,803,130 | 8/1957 | Bernhardt . |
| 4,615,591 | 10/1986 | Smith et al. .......................... 359/391 |
| 4,785,177 | 11/1988 | Besocke .......................... 250/442.11 |
| 4,968,914 | 11/1990 | West et al. ..................... 250/442.11 |
| 5,162,951 | 11/1992 | Sorce .................................. 359/871 |
| 5,165,297 | 11/1992 | Krueger .............................. 359/393 |
| 5,212,580 | 5/1993 | Coad et al. .......................... 359/391 |
| 5,286,977 | 2/1994 | Yokoyama et al. ............. 250/442.11 |

Primary Examiner—Loha Ben
Assistant Examiner—Thong Nguyen

[57] ABSTRACT

The stage plate of a sample carrying stage for optical instruments has a piezoelectric translator that drives the stage plate centrally and directly, and a linear guide comprising at least two elastic elements to guide the stage plate. The elastic elements are arranged coaxially to the piezoelectric translator, which extends through a central recess in the elastic elements.

10 Claims, 3 Drawing Sheets

LINEARLY FINE-ADJUSTABLE STAGE

BACKGROUND OF THE INVENTION

1. Field of the Invention

This invention relates to linearly adjustable stages for optical instruments, microscopes and the like.

2. Discussion of the Prior Art

Usually in microscopy, the sample-carrying stage is adjusted for focusing, either manually or by a motor via gears with a high step-down ratio. The sample-carrying stage is guided on the microscope stand linearly by slide guides or ball guides. These arrangements are satisfactory when a relatively large adjustment range is most important. However, there are now an entire series of applications that, necessitate having as fine as possible linear adjustment, with freedom from play and friction, etc. For these applications, use of so-called piezo translators has been recommended. These piezo translators are offered by various firms, some with an integrated path transducer and a built-in guide for the part to be displaced. Such a positioning element is described in DE-OS [German Laid-Open Patent Application] 3,632,964. In that document, spring bars guide the driven part. This part is connected by the spring bars on one side to its support, which is the stationary part of the positioning element.

Such one-sided guiding is unfavorable to the extent that the arrangement is conducive to radial temperature drifts due to thermal length changes of the guide elements (i.e., the guided part shifts in a direction perpendicular to the guide direction). Moreover, when such guides are integrated into the positioning element, their dimensions are generally not suited to user requirements.

A stage plate carded by three piezoelectric translators is known from U.S. Pat. No. 4,785,177. The plate can be fine-adjusted in height, and can be displaced horizontally and rotated, by means of suitable control frequencies that act on the three translators. However, the plate is not guided in a straight line and is not secured against lateral displacements.

U.S. Pat. No. 2,803,130, corresponding to DE-PS [German Granted Patent] 1,000,614 describes guiding a microscope objective linearly by means of spring diaphragms in a micro-hardness tester. However, the spring diaphragms have multiple slots in the peripheral direction in order to achieve the greatest possible stroke, and an air-filled bellows is used for the drive. Finely resolved adjustment motions cannot be achieved by these means.

SUMMARY OF THE INVENTION

The objective of the present invention is to provide an adjustable stage, free from play and friction, with the finest possible adjustment over a relatively small adjustment path, especially for optical instruments and microscopes having high resolution. The stage plate is to be well secured against lateral displacement, including displacement caused by thermal drift.

Such stages are required, for example, for high-resolution confocal microscopes used to obtain images from different object planes (so-called Z-resolved representations of the object). According to the invention, this objective is achieved by a linearly fine-adjustable stage device having:

a displaceable stage, a piezoelectric translator that drives the displaceable stage centrally and directly, and a linear guide comprising at least two elastic elements that guide the displaceable stage. The elastic elements are arranged coaxially of the piezoelectric translator and have central apertures through which the piezoelectric translator extends to drive the displaceable stage.

A space-saving, compact construction, without radial temperature drift, results from the coaxial arrangement of the piezotranslator and linear guide. The construction has very little play in the guide direction, because the piezotranslator drives the stage centrally and directly. The construction provides a very symmetrical, simple stage. Annular spring diaphragms, or mutually parallel groups of spring links arranged one behind the other can be used as the elastic elements. Freedom from play with a high degree of linearity of the guided motion can be achieved with either of these guiding means.

BRIEF DESCRIPTION OF THE DRAWINGS

Preferred embodiments of the invention will now be described, taken together with the accompanying drawings, in which.

DETAILED DESCRIPTION OF PREFERRED EMBODIMENTS OF THE INVENTION

Figure 1:
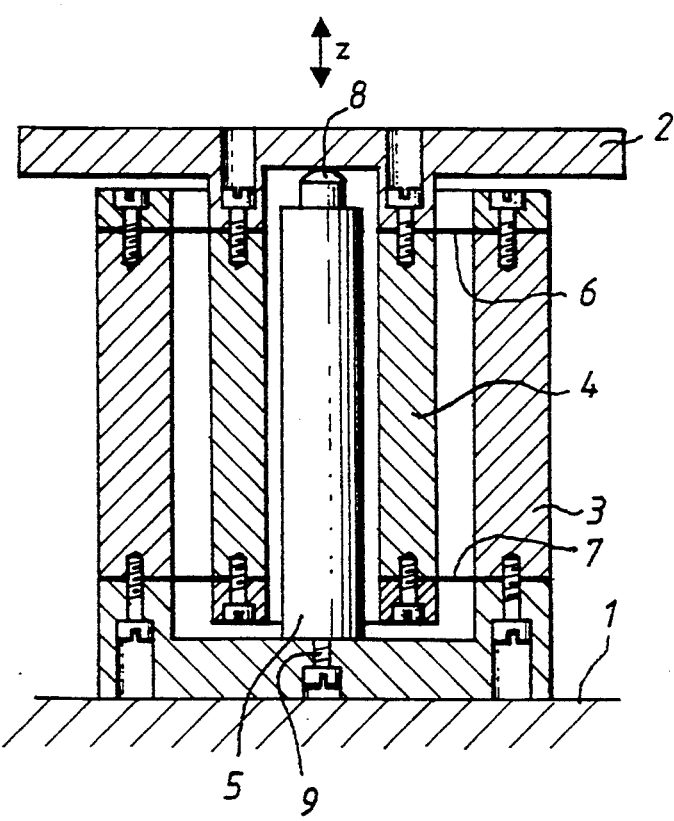
FIG. 1 is a stage according to a first embodiment of the invention, shown in section parallel to the guiding direction.

The stage shown in FIG. 1 has a cylindrical stationary part (3) that is attached, in a manner not shown in more detail here, to a likewise stationary carrier or instrument (1) on which the stage is used. A piezotranslator (5) is fastened centrally by a screw (9) to the cylinder stationary part (3), and its displaceable head portion (8) acts against the underside of a stage plate (2) laid over it. The translator (5) concerned is sold by Physic Instrumente GmbH of Waldbronn, Germany and is designated LVPC Translator P-841,40.

Figure 3:
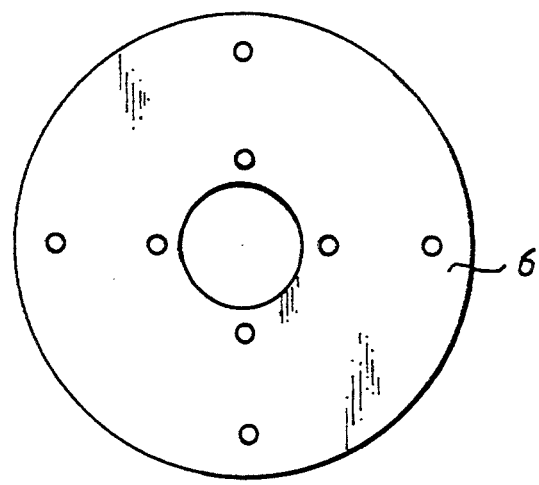
FIG. 3 is a spring diaphragm of the embodiment according to FIG. 1, shown in plan view.

This piezotranslator has a built-in position sensor and, by means of connected control electronics, can displace stage plate (2) in a hysteresis-free manner and with very little play in the direction of the arrow referenced z. A cylindrical part (4) is screwed to the underside of stage plate (2) and is connected to the stationary cylindrical part (3) by means of two annular spring diaphragms of sintered bronze, which are spaced apart about 8 cm. in the z-direction. One of the two spring diaphragms, the diaphragm (6) is shown in the plan view of FIG. 3. The spring diaphragms (6) and (7) guide the stage plate (2) without play over displacement paths of typically several hundredths of a millimeter up to about 1/10 mm. Only elastic deformations of the spring diaphragms occur in this region, which is matched to the displacement path of the piezotranslator (5).

Figure 2:
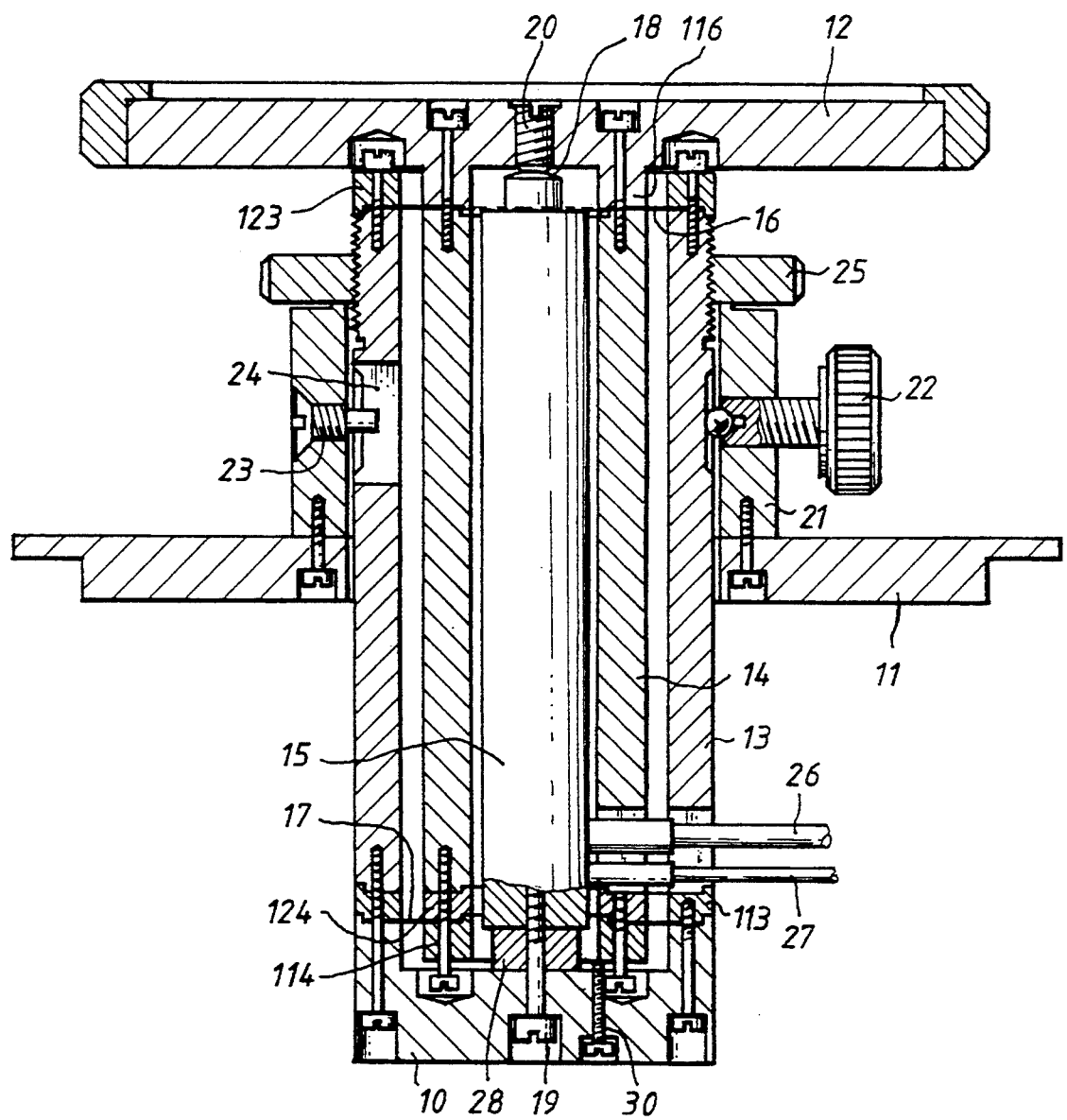
FIG. 2 is a detailed sectional view of the stage according to a second embodiment of the invention.

The embodiment according to FIG. 2 is in principle constructed quite similarly. The stationary table support is denoted (11). A support ring (21) is supported on the table support (11). The upper side of the ring support (21) lies against the outer cylindrical part (13) of the stage, via a threaded ring (25). Coarse adjustment is effected by rotating threaded ring (25). A pin (23) in the support ring (21), engages in a groove (24) in the part (13), and serves to guide the stage in a straight line and against rotation during coarse adjustment. The part (13) can be fixed (clamped) relative to the stage support (11) by a knurled screw (22). A likewise cylindrical base part (10) is screwed to the cylindrical part (13) via a ring (113). A second ring (123) is screwed to the upper end of the cylindrical part (13). Two annular diaphragm springs (16) and (17) are clamped at their outer edges respectively between the ring (123) and the part (13) and between the ring (113) and the base part (10).

The diaphragm (17) is clamped at its inner edge by two rings (114) and (124). These rings are screwed to the underside of a second cylindrical part (14). The upper side of the part (14) and a concentric annular shoulder (116) on the underside of the stage plate (12) clamp the second diaphragm (16) at its inner side. Thus, also in this embodiment, the two diaphragm springs (16) and (17) form the guide for the stage plate (12). A piezotranslator (15) is installed centrally on the base part (10) by means of a screw (19) and a tuning disc (28). Movable positioning element (18) of the piezotranslator acts against the underside of a tuning screw (20) that extends centrally through the stage plate (12).

The piezotranslator (15) is of the same type described in connection with FIG. 1. Its control cable (26) and a signal cable (27) of a built-in position sensor are led out through lateral openings in the cylindrical parts (13) and (14).

The diaphragms consist of springy bronze sheet metal, 0.05 mm thick. Their inner bore and their outer diameter are concentric and are designed-to-fit, in order to align the parts (13) and (14) coaxially during assembly.

During assembly of the two diaphragms, care must be taken so the inner and the outer clamping rings lie at exactly the same height, in order to avoid distorting the spring diaphragms when they are assembled in the stage. Three support screws are therefore provided as assembly aids. One of them, the support screw (30), is visible in FIG. 2. This support screw (30) is removed after assembly is completed.

Figure 4:
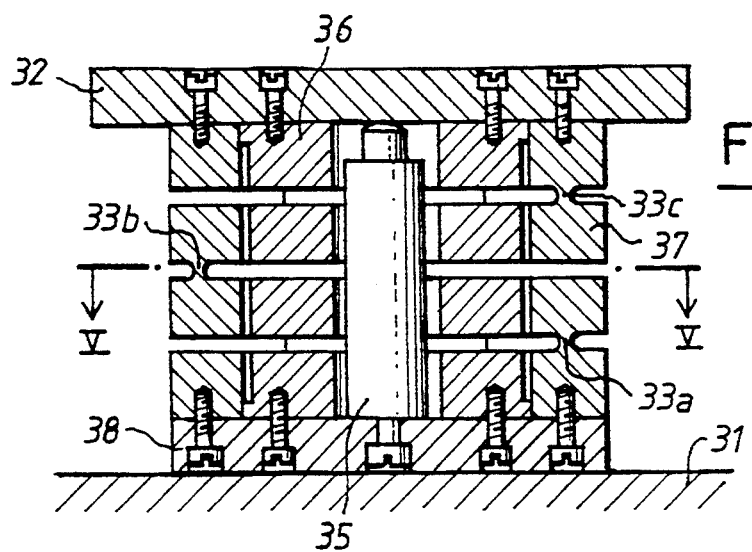
FIG. 4 is a third embodiment of the invention shown in section in a plane parallel to the guiding direction, along the arrows IV—IV in FIG. 5.
Figure 5:
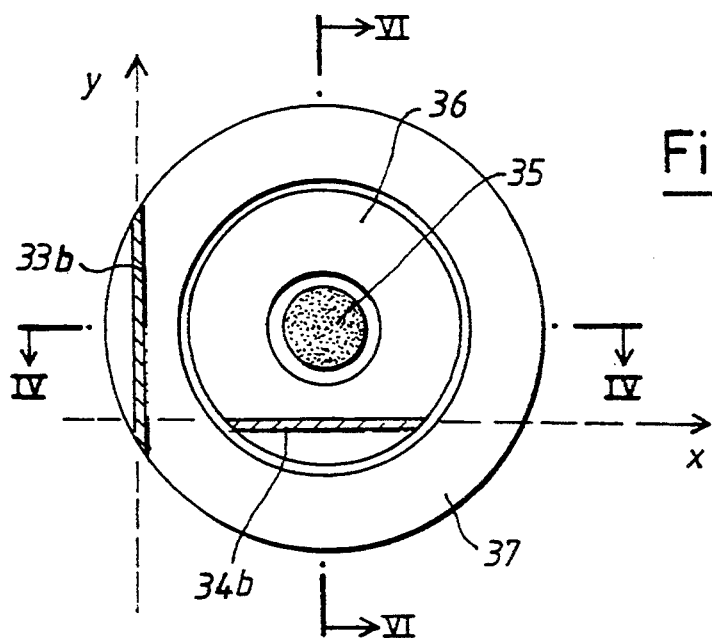
FIG. 5 is the embodiment according to FIG. 4, shown in section in a plane perpendicular to the guiding direction along the arrows V—V in FIG. 4.
Figure 6:
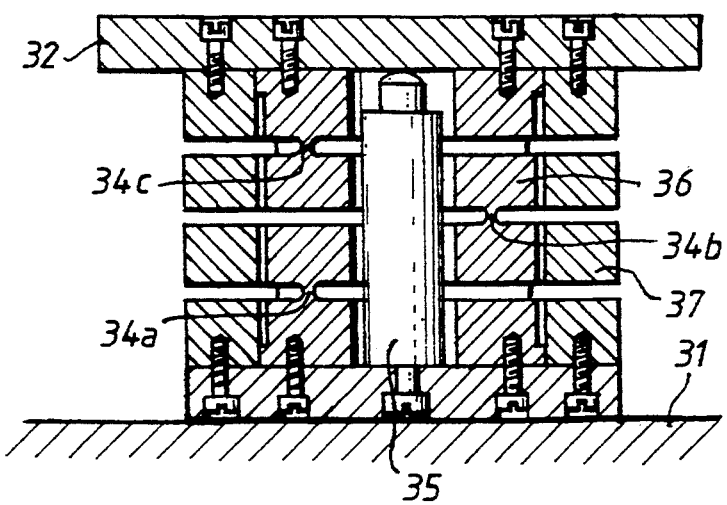
FIG. 6 is the embodiment according to FIG. 4, shown in section in a plane parallel to the guiding direction and rotated through 90° about the guiding direction relative to the representation of FIG. 4, along the arrows VI—VI in FIG. 5.

In the embodiment according to FIGS. 4-6, a piezotranslator (35) drives a stage plate (32) centrally and is supported on a stationary part (31). The piezotranslator (35) is coaxially surrounded by two parallel groups of spring links that are arranged one behind the other. The first group (37) of spring links consists of four annular plates with central bores connected together alternatively left and right by webs of material (33a, b and c), that act as hinges. The axes of rotation of this first group of spring links are all oriented parallel to the direction denoted by y in FIG. 5.

A second group of spring links is arranged within the first stack of annular plates, and likewise consists of several individual links arranged one behind the other. In the sectional drawing turned through 90° (FIG. 6), the webs of material (34a-c) that connect together the four plates of the second stack of spring links can be clearly distinguished. The axes of rotation of this second group of spring links are oriented parallel to the direction denoted by x in FIG. 5. Both groups of annular spring link stacks are connected together at their lower side by a plate (38), and both groups are screwed at their upper side to the stage plate (32). The parallel arrangement of the two groups of spring links, with the alignment of their hinge axes mutually turned through 90°, forms a linear guide that is secured against tilting and is easy to produce, because the arrangement is constructed solely of turned parts. It is likewise free from play and friction and is insensitive to dust, dirt and radial temperature drifts.

I claim:

1. A linearly fine-adjustable stage device comprising: displaceable stage means,
    piezoelectric translator means that drives said displaceable stage means centrally and directly, and
    linear guide means comprising at least two elastic elements to guide said displaceable stage means,
    wherein said elastic elements are arranged coaxially of said piezoelectric translator means and have central apertures through which said piezoelectric translator means extends to drive said displaceable stage means.

2. A stage device according to claim 1, wherein said displaceable stage means is displaceable in a linear direction, further comprising:
    a stationary part including cylindrical support means, and
    cylindrical means on said displaceable stage means,
    wherein said elastic elements comprise annular spring diaphragms that are fastened spaced apart in said direction of displacement of said displaceable stage means to said cylindrical support means on said stationary part and to said cylindrical means on said displaceable stage means respectively.

3. A stage device according to claim 1, wherein
    said elastic elements comprise at least a first and second group of spring links,
    said at least first and second group of spring links are arranged mutually parallel to each other,
    said first group of spring links is arranged to be tiltable about axes in the same axial direction defining a first axial direction,
    said second group of spring links is arranged to be tiltable about axes in the same axial direction defining a second axial direction, and
    said first and second axial directions are oriented at an angle with respect to one another that differs from zero degrees.

4. A stage device according to claim 3, wherein said first and second axial directions are oriented with respect to one another at an angle of 90 degrees.

5. A stage device according to claim 3, wherein each of said first and second group of spring links comprises at least two spring links arranged one behind the other.

6. A stage according to claim 5, wherein each of said groups of spring links comprises three spring links arranged one behind the other.

7. A stage device according to claim 1, wherein said piezoelectric translator means comprises position sensor means integrated therewith.

8. A stage device according to claim 1, further comprising coarse adjustment means for said displaceable stage means and linear guide means for securing said displaceable stage means against rotation.

9. A stage device according to claim 1, wherein said stage device is for high-resolution microscopes.

10. A stage device according to claim 1, wherein said stage device is for confocal microscopes.

* * * * *